United States Patent [19]

Bailey et al.

[11] 4,411,503

[45] Oct. 25, 1983

[54] AIR-PLATEN BEARING

[75] Inventors: David C. Bailey, Cocoa Beach, Fla.; Robert E. Klein, Quincy, Ill.

[73] Assignee: Harris Corporation, Melbourne, Fla.

[21] Appl. No.: 908,729

[22] Filed: May 23, 1978

[51] Int. Cl.$^3$ .............................................. G03B 1/52
[52] U.S. Cl. ............................ 352/222; 308/DIG. 1; 308/5 R; 226/97
[58] Field of Search ................ 352/222; 308/DIG. 1, 308/9; 226/97

[56] References Cited

U.S. PATENT DOCUMENTS

| | | | |
|---|---|---|---|
| 1,231,360 | 6/1917 | Howell | 352/222 |
| 2,571,868 | 10/1951 | Haller | 308/DIG. 1 |
| 2,645,534 | 7/1953 | Becker | 308/DIG. 1 |
| 2,691,320 | 10/1954 | Borberg | 352/222 |
| 2,696,410 | 12/1954 | Topanelian | 308/DIG. 1 |
| 3,103,850 | 9/1963 | Khoury et al. | 352/222 |
| 3,156,399 | 11/1964 | Wadey | 308/DIG. 1 |
| 3,457,007 | 7/1969 | Conroy | 352/222 |
| 3,885,417 | 5/1975 | Stern | 308/DIG. 1 |

FOREIGN PATENT DOCUMENTS 1225045  9/1966  Fed. Rep. of Germany ...... 352/222

OTHER PUBLICATIONS

IBM Technical Disclosure Bulletin, vol. 15, No. 6, Nov. 1972.
IBM Technical Disclosure Bulletin, vol. 5, No. 4, Sep. 1962.
RCA Technical Notes, RCA TN No. 457, Sep. 1961.
Modulated Air Blast for Reducing Film Buckle, by Willy Borberg, JSMPTE, vol. 59, pp. 94–100, Aug. 1952.

*Primary Examiner*—Monroe H. Hayes
*Attorney, Agent, or Firm*—Antonelli, Terry & Wands

[57] ABSTRACT

A fluid bearing platen for a film gate structure contains a pair of cavities to which pressurized fluid, such as air, to be applied against the opposing surfaces of a photographic film, is supplied. Between each respective cavity and one side of the film there is disposed a thermodynamically non-throttling material, such as porous stainless steel, through which the pressurized fluid from the cavities passes, to be directed against the opposite sides of the film. The non-throttling material effectively creates an adiabatic transfer from the cavities to the film's opposing surfaces, thereby eliminating temperature loss and avoiding the wrinkling or warpage of the film.

16 Claims, 2 Drawing Figures

AIR-PLATEN BEARING

The U.S. Government has rights in this invention pursuant to contract No. F302602-74-C-0152 awarded by the Department of the Air Force.

FIELD OF THE INVENTION

The present invention relates to a support structure for a recording medium, such as a photographic film, and is particularly directed to a fluid bearing platen by way of which a recording medium may be maintained within a prescribed tolerance of an established focal plane.

BACKGROUND OF THE INVENTION

In photographic imaging systems, such as those used for information storage and retrieval, photographic film transport and positioning arrangements may commonly employ film positioning and support structures known as gates. The purpose of the gate is to maintain a segment of photographic film relative to the focal plane of imaging optics and to permit light to be selectively directed through the film segment.

Desirably, the film gate should be such that physical contact between the film surface and a friction imparting element is prevented, in order to avoid scratching the film, which could possibly cause a loss of information contained in an image frame. To this end, improvements in film gate structures have lead to the development of fluid gates, through which a curtain, or stream, of air is generated in the area of the gate so as to provide a medium by way of which the film may be frictionlessly supported. An example of such an air pressure gate is described in U.S. Pat. No. 3,457,007 to Conroy, and consists of a differential pressure gate for a motion picture projector having a plurality of peripheral ducts which pass through the walls of the gate aperture. Air pressure is introduced through these ducts in an effort to apply a substantially uniform pressure throughout a chamber disposed on one side of a photographic film. The purpose of the differential pressure applied to a frame of motion picture film as it passes through the gate is to limit the excursion of the film in one direction and to stabilize the film. A similar pressure control arrangement for a film gate is described in German Auslegeschrift No. 1225045 and consists of a pair of parallel-positioned transparent plates between which the film is advanced. A plurality of apertures or air ducts are distributed around the periphery of the gate for applying compressed air against each side of the film, so as to maintain the motion picture film within a small spacing between the transparent plates.

Another film advance and support system which employs pressurized air flow is described in U.S. Pat. No. 3,103,850 to Khoury et al. Like the support arrangements described in the above-discussed publications, the film handling apparatus described in the Khoury et al patent contains a plurality of orifices disposed at the periphery of the support for directing air against opposite surfaces of a film strip in an effort to exert stabilizing forces on the film strip and to maintain the film strip substantially equidistant between the opposite internal surfaces of the film gate.

Now, although the film gate arrangements discussed briefly above purport to stabilize the position of a film strip within the gate, they are effectively limited to dynamic systems wherein the film is advanced either continuously or intermittently (with only a brief pause period) through the gate. It has been found by the present inventors that arrangements of the type described above, which employ simple orifice pressure inlets, cause the air passing through the air supply ducts to undergo a substantial temperature change, so that the air striking the film and creating the air bearing is cooled considerably relative to the air on the input side of the air bearing orifices. This cooled air creates a temperature gradient across the film, which may lead to curving or warping of the film. This condition is particularly noticeable for a static condition wherein the film, rather than being rapidly advanced past the film gate, is held stationary for a period of time considerably longer than even the temporary interruption of movement in a motion picture type of system.

As a result of this temperature differential created by previously proposed film gate arrangements, such systems are unsuitable for supporting films that may be required to be maintained in a static condition in the film gate and/or which require extremely accurate positioning relative to the imaging optics focal plane. This latter requirement is of paramount importance in holographic recording and reproduction optical systems wherein the tolerances desired may be on the order of several microns.

SUMMARY OF THE INVENTION

In accordance with the present invention, there is provided a fluid bearing film gate arrangement which does not suffer from the throttling, non-adiabatic conditions of prior art film gate structures, and which thereby permits the film gate to be employed for both dynamic and static support requirements without fear of distortion of the film surface. Moreover, because of the extremely precise fluid positioning control afforded by the present invention, it is possible to limit excursions of the film within the gate to tolerances not heretofore achieved with prior art pressurized air-gate arrangements. Especially, frictionless positioning of the film within several microns of an image plane is attainable, thereby making the present invention particularly suitable for high precision optical imaging systems such as holography systems.

For this purpose, the film gate structure of the present invention contains a pair of cavities to which pressurized fluid, such as air, to be applied against the opposing surfaces of a photographic film, is supplied. Between each respective cavity and one side of the film there is disposed a thermodynamically non-throttling material, such as porous stainless steel, through which the pressurized fluid from the cavities passes, to be directed against the opposite sides of the film. The non-throttling material effectively creates an adiabatic transfer from the cavities to the film's opposing surfaces, thereby eliminating temperature loss and avoiding the wrinkling or warpage of the film which occurs with prior art pressure duct arrangements. As a result, the novel film gate structure of the present invention can be used for any desired mode of film support, either dynamic or static.

DETAILED DESCRIPTION

Figure 1:
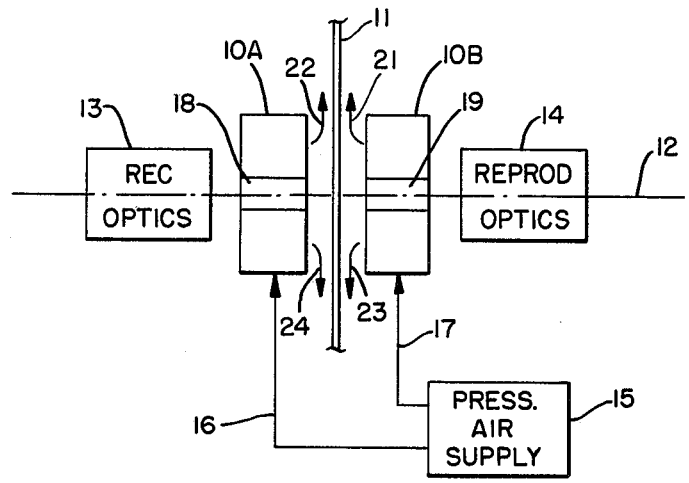
FIG. 1 is a general block diagram illustration of a fluid bearing film gate arrangement.

Referring to FIG. 1, there is shown a general illustration of a fluid bearing film gate arrangement for frictionlessly supporting a medium 11, such as a strip of photographic film, in the imaging plane of a recording optics arrangement 13 or a reproduction optics arrangement 14. Recording and reproduction optics arrangements 13 and 14 may contain suitable light source and lens elements conventionally employed in the art, coaxially aligned on optical axis 12; an explanation of the details of optics 13 and 14 is unnecessary for an understanding of the present invention and therefore will be omitted for brevity.

The air bearing film gate arrangement is comprised of a pair of fluid bearing elements 10A and 10B, having respective optical apertures 18 and 19 coaxial with optical axis 12. Each of 10A and 10B is coupled to a source 15 of pressurized fluid, such as pressurized air, via fluid coupling ducts 16 and 17. Upon being supplied with fluid from source 15, elements 10A and 10B direct a fluid curtain in the direction of arrows 21 through 24 at the opposite sides of film strip 11, thereby creating a frictionless fluid bearing by way of which film strip 11 is maintained in the proper alignment with the coplanar image planes of optical arrangements 13 and 14. As will be described in more detail below, with reference to FIG. 2, because the fluid bearing elements are thermodynamically non-throttling, there is no temperature loss through the elements and a temperature gradient is not established across the surface of the film strip 11. Therefore, no warping or physical distortion of film strip 11 will occur irrespective of the mode of use of the film gate arrangement. Thus, film strip 11 may remain stationary within the film gate without fear of wrinkling or warping due to the fluid bearing.

Figure 2:
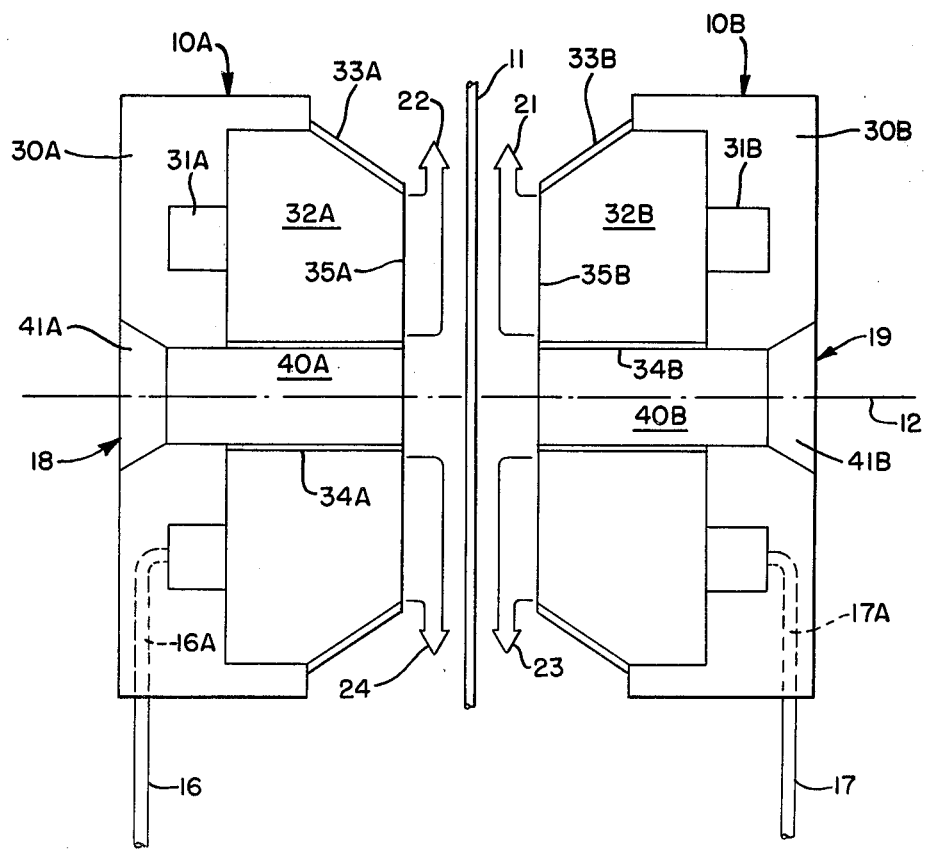
FIG. 2 is a detailed sectional view of a nonthrottling air bearing film support structure.

Referring now to FIG. 2, the details of the fluid bearing elements 10A and 10B themselves are shown in section. For purposes of a concise explanation of the invention, each fluid bearing element 10A and 10B may be assumed to be of generally cylindrical configuration with optical axis 12 being coaxial with axes of cylindrically shaped elements 10A and 10B. Of course, the present invention is not limited to any particular shape, but may generally be any suitable shape, such as square or rectangular, for example, without departing from the teachings herein. A cylindrically shaped bearing structure is presented in order to permit a simplified sectional illustration of the fluid bearing structure.

Fluid bearing elements 10A and 10B, which are fixedly spaced apart from each other by a prescribed spacing, as by way of suitable bolts and spacers, not shown, respectively include cylindrically shaped housing elements 30A and 30B, the central portions of which have been drilled out to provide a pair of optical apertures 18 and 19, the axes of which are coaxial with optical axis 12. Each of apertures 18 and 19 may include a respective elongated tubular portion 40A and 40B which opens into the space between the film strip 11 and the edges of bearing elements 10A and 10B, and a shortened, conically shaped portion 41A and 41B facing the recording and reproduction optics 13 and 14 shown in FIG. 1. Housing portions 30A and 30B may be made of any suitable non-porous material, such as aluminum or stainless steel.

Housing portions 30A and 30B are further provided with annular-shaped grooves or cavities 31A and 31B to which the fluid supply conduits 16 and 17 from the pressurized fluid supply shown in FIG. 1 are connected by suitable channels 16A ahnd 17A bored or drilled in housing portions 30A and 30B. Firmly seated against annular fluid distribution cavities 31A and 31B are respective cylindrically shaped porous bodies 32A and 32B. The outer surface of each porous body 32A and 32B may be suitably tapered to facilitate the guiding of film strip 11 through the space between bearing elements 10A and 10B. The conically shaped tapered edge of bodies 32A and 32B may be coated with a sealing material 33A and 33B, such as a non-porous glue or dope, or otherwise sealed, to prevent the exit of fluid from the tapered surfaces. Similarly, the interior cylindrical walls of bodies 32A and 32B, coaxial with optical axis 12, may be coated with a suitable sealing material. Porous bodies 32A and 32B may be affixed to housing portion 10A and 10B by a suitable adhesive, such as a layer of epoxy, not shown, to thereby affix and seal porous bodies 32A and 32B to respective housing portions 30A and 30B, except at the area of air distribution cavities 31A and 31B. The remaining, non-sealed surface areas 35A and 35B of each of porous bodies 32A and 32B are those surface portions which are coplanar with the intended plane of film strip 11, namely the image planes of optics 13 and 14. It is from these remaining surface areas 35A and 35B that fluid which has been introduced into and distributed throughout cavities 31A and 31B is applied against the opposite surfaces of film strip 11 after having adiabatically traversed porous bodies 32A and 32B.

Materials suitable for porous bodies 32A and 32B include sintered stainless steel, laminated layers of different aperture-sized metal, or a dense sheet of compacted minute plastic spheres, such as Tegraglass (T.M. 3M Co.). Of course, the present invention is not limited to the use of only these materials, but other suitable porous materials may be used as long as they effectively permit a thermodynamic non-throttling passage of fluid supplied thereto, to establish a fluid bearing to support film strip 11. As one example involving the use of sintered stainless steel, 0.25 psi/in$^2$ resistance porous stainless steel was found suitable for a pressure range of 10 through 15 PSI. At 10 through 12 PSI, this porous stainless steel may supply a flow rate of 0.22 CFM for establishing the air bearing from surfaces 35A and 35B, in response to an air input pressure into coupling ducts 16 and 17 in a range of 8 to 18 PSI. Again, it is to be noted that these parametric values are not limitative of the invention, but simply provide an exemplary range of values for purposes of an explanatory embodiment.

As will be appreciated from the foregoing description, the thermodynamic characteristics of the porous fluid coupling bodies 32A and 32B of the present invention are a considerable improvement over orifice-type air bearing support structures of the prior art which unavoidably cause a throttling of the air pressure, and thereby create a temperature loss from the pressure upon the side of the orifice to the film exit side, whereat the film is undesirably subjected to a super-cooled fluid. Since there is no temperature loss through bodies 32A and 32B, the pressure transfer therethrough is effectively perfectly adiabatic, permitting the film strip 11 to be supported in a frictionless manner by the non-throttling fluid bearing for any length of time desired. Thus, the fluid bearing arrangements of the present invention is not restricted to a dynamic mode of operation, which is the case of prior art types of throttling, non-adiabatic bearing arrangements. Moreover, so improved is the fluid bearing arrangement of the present invention, that it is possible to maintain a depth-of-focus in the order of ±3 μm, which makes the fluid bearing film gate of the present invention particularly useful in state of the art information storage and retrieval systems, such as holography recording and readout systems.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. An apparatus for supporting a substantially planar-shaped medium in a frictionless manner comprising:
    first and second fluid bearing elements, to which a fluid to be directed against respective opposite surfaces of said medium is supplied, disposed adjacent to, but spaced apart from, the opposite surfaces of said medium; and
    means for supplying said fluid to said first and second fluid bearing elements; and wherein
    each of said fluid bearing elements comprises a material which is thermodynamically non-throttling from the location at which fluid is supplied to said material to the location from which fluid exits said material and is directed against a respective side of said medium.

2. An apparatus according to claim 1, wherein said material is porous.

3. An apparatus according to claim 1, wherein each of said fluid bearing elements includes a housing having a cavity to which said fluid supplying means is coupled, and wherein said material is coupled to said cavity so as to receive said fluid to be directed against said medium, and adiabatically transfer said fluid through said material from said cavity and cause the adiabatically transferred fluid to be directed against said medium.

4. An apparatus according to claim 3, wherein each of said fluid bearing elements further includes an aperture which passes through said housing and said material to permit the opposite surfaces of said medium to be optically coupled externally of said apparatus.

5. An apparatus according to claim 4, wherein said medium comprises a photographic film, and wherein the surface of said material adjacent to said film is the only surface of said material from which said fluid exits said material to be directed against said film.

6. An apparatus according to claim 5, wherein the surface of said material adjacent to said film is substantially planar.

7. An apparatus according to claim 6, wherein said material is porous.

8. An apparatus according to claim 1, wherein said medium comprises a photographic film, and wherein the surface of said material adjacent to said film is the only surface of said material from which said fluid exits said material to be directed against said film.

9. An apparatus according to claim 8, wherein the surface of said material adjacent to said film is substantially planar.

10. In an apparatus for supporting a substantially planar-shaped photographic film in a frictionless manner, said apparatus including
    first and second fluid bearing elements, to which a fluid to be directed against respective opposite surfaces of said film is supplied, disposed adjacent to, but spaced apart from, the opposite surfaces of said film, the surface of each of said fluid bearing elements adjacent to said film being substantially planar, and
    means for supplying said fluid to said first and second bearing elements so as to cause a respective fluid bearing to be generated adjacent to the substantially planar surface of each element and thereby be directed against a respective opposite surface of said film in support thereof,
    the improvement wherein
    each fluid bearing element is so configured as to prevent the fluid bearing generated thereby from distorting the surface of the film upon which the bearing is directed irrespective of movement of the film past said fluid bearing elements.

11. The improvement according to claim 10, wherein each fluid bearing element is so configured as to be thermodynamically non-throttling from the location at which fluid is supplied to the element to the location from which fluid exits the element and is directed against the photographic film.

12. The improvement according to claim 11, wherein each of said fluid bearing elements further includes an aperture therethrough for optically coupling the opposite surfaces of said film externally of said apparatus.

13. An apparatus for supporting a substantially flat photographic film in a frictionless manner, said apparatus including
    a fluid bearing element, having a substantially planar surface, to which a fluid to be directed against said film is supplied; and
    means for supplying said fluid to said fluid bearing element and causing a fluid bearing to be generated adjacent said substantially planar surface and thereby be directed against said film for support thereof, and wherein
    said fluid bearing element is so configured as to prevent the fluid bearing generated thereby from distorting the surface of the film upon which the bearing is directed irrespective of movement of the film past said fluid bearing element.

14. An apparatus according to claim 13, wherein said fluid bearing element comprises a material which is thermodynamically non-throttling from the location at which said fluid is supplied to said material to the location from which fluid exits said material and is directed against said photographic film.

15. An apparatus according to claim 14, wherein said material is porous.

16. An apparatus according to claim 14, wherein said fluid bearing element includes a housing having a cavity to which said fluid supplying means is coupled, and wherein said material is coupled to said cavity so as to receive said fluid to be directed against said film and adiabatically transfer said fluid through said material from said cavity and cause the adiabatically transferred fluid to be directed against said film.

* * * * *